April 27, 1943.　　　　G. G. MORIN　　　　2,317,692
PHOTOGRAPHIC ENLARGER
Filed Sept. 6, 1940　　　　2 Sheets-Sheet 1

INVENTOR
GEORGE G. MORIN
BY Chapin & Neal
ATTORNEYS

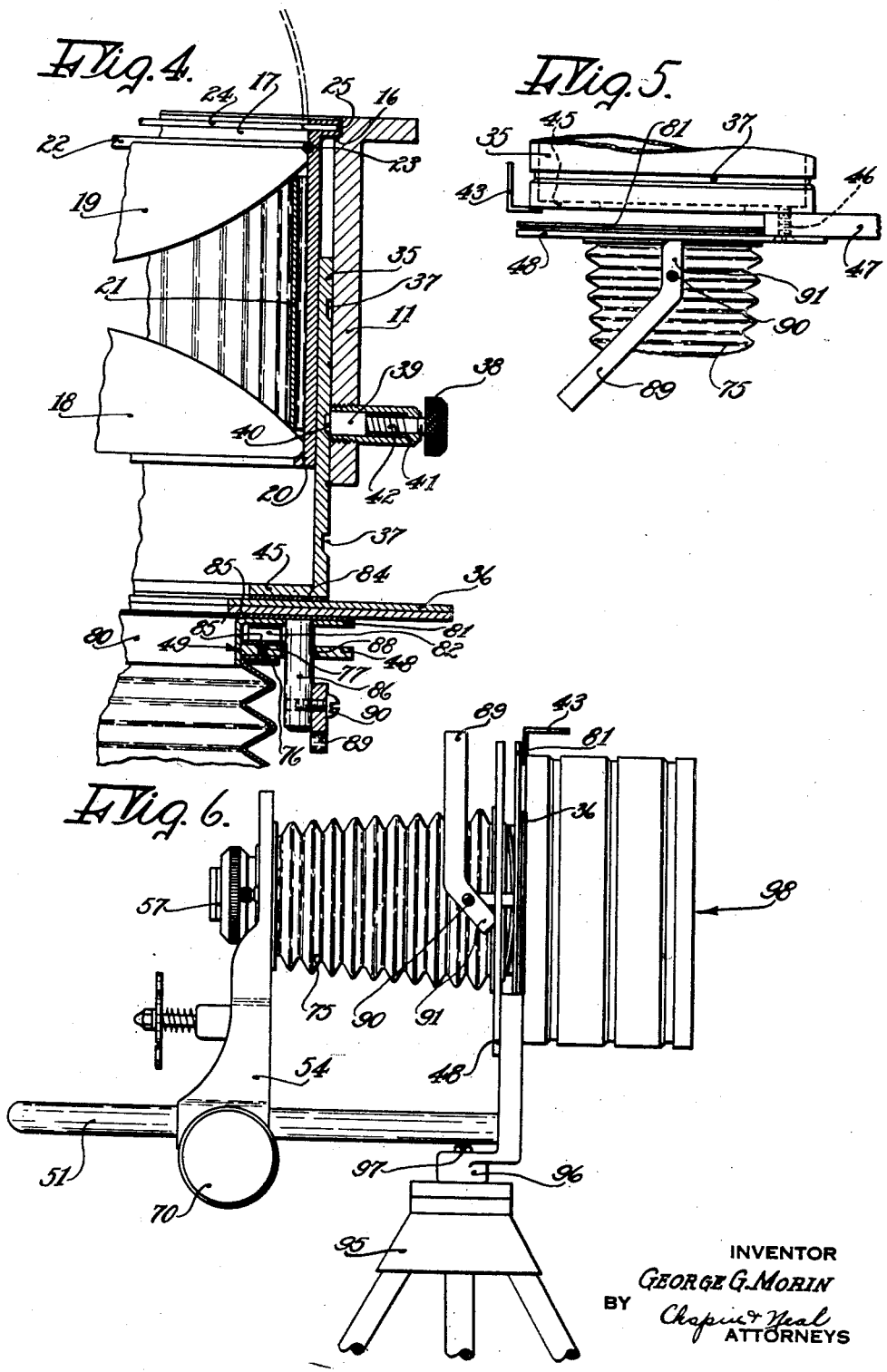

Patented Apr. 27, 1943

2,317,692

UNITED STATES PATENT OFFICE 2,317,692

PHOTOGRAPHIC ENLARGER

George G. Morin, Holyoke, Mass.

Application September 6, 1940, Serial No. 355,638

8 Claims. (Cl. 88—24)

This invention relates to photographic enlargers and has particular reference to the head structure thereof. One object of the invention is to provide a simple enlarger construction in which the negative supporting structure can be readily adjusted relative to the condenser lens when the projecting lens is changed to one of different focal length. A further object is to provide an improved adjusting mechanism for changing the relative position of the lens and negative holder during focusing. Another object is to provide a novel means for supporting the negative holder. An additional object is to provide a head structure which permits the enlarger to be readily converted into a copying camera. A further object is to provide a new and improved condenser lens housing. The foregoing and other objects, as well as the preferred form of invention for accomplishing these objects, will appear more fully from a reading of the specification and claims.

Referring to the drawings:

Fig. 4 is an enlarged sectional view of a portion of the condenser housing and adjacent parts;

Fig. 5 is an elevation of a portion of the enlarger head showing the negative holder receiving slot; and Fig. 6 shows how the enlarger may be adapted for use as a copying camera.

Figure 1:
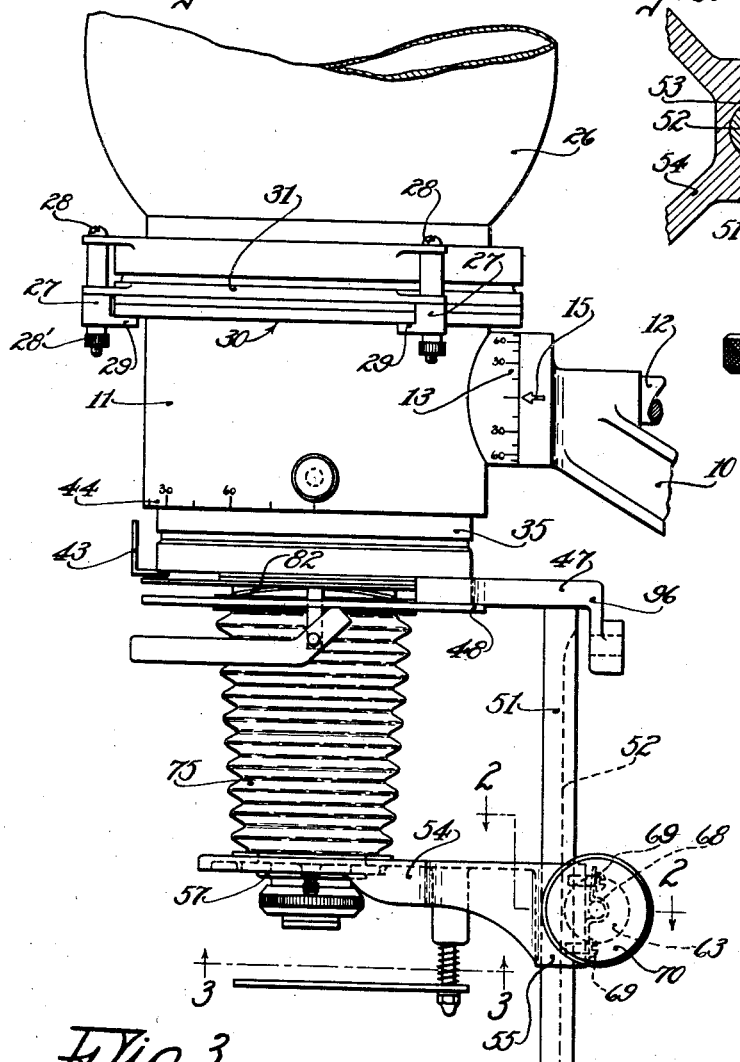
Fig. 1 is a side elevation, partly broken away, of an enlarger head constructed in accordance with my invention.

As shown in Fig. 1, the enlarger head is carried by a supporting arm 10 which may be vertically adjustable on the usual supporting structure (not shown). A condenser housing 11 is secured to arm 10 by screw 12 for angular adjustment about a horizontal axis, in a manner such for example as that described in my prior application, Serial No. 308,542, filed December 11, 1939. Indicia 13 on a boss formed on the housing cooperate with the reference arrow 15 on the arm 10 to indicate various angular settings of the housing.

Supported within the housing 11 by an annular shoulder 16 is a condenser lens bucket 17 of cylindrical shape (see Fig. 4), containing the usual plano-convex lenses 18 and 19. As is clear from the drawings, the lower lens 18 rests on an inwardly directed shoulder 20 while the upper lens 19 is supported in spaced relation to the lower lens by spacer 21. This spacer may be of any suitable form but, as herein shown, consists of a short sleeve of corrugated metal. A spring wire binding ring 22 may be snapped into place in a groove 23 formed on the inner surface of bucket 17 and serves to press against the surface of the upper lens 19 to secure the lenses firmly in position. A bail 24 in the form of a semi-circular spring wire has its terminal portions bent and inserted in a pair of radial holes 25 (one of which is shown) formed in the inner surface of the bucket above the binding ring 22. This bail may be swung to the vertical dotted position shown and conveniently used to remove the bucket and condenser lens assembly carried thereby.

Supported on condenser housing 11 is a lamp housing 26, see Fig. 1. Any suitable means may be employed for this purpose but I preferably use the light-tight, ventilated form which is the subject matter of my pending application Serial No. 335,707, filed May 17, 1940. As explained in that case, the lamp housing 26 is secured to the condenser housing 11 by lugs 27 carried on bolts 28 having the thumb nuts 28' with shoulders 29 formed on the lugs underlying the upper rim 30 of the condenser housing. A spacing element 31 is placed between the two housings and cooperates with the lamp housing 26 to permit the circulation of air within the housing and also supports a heat resisting element to insulate the condenser lenses from radiant heat from the light source.

A receiver 35 supporting a negative holder 36 and formed as a cylindrical sleeve slidably fits between the inner surface of the condenser housing 11 and the bucket 17 as shown in Fig. 4. This receiver 35 is provided with a plurality of circumferential grooves 37 on its outer cylindrical surface and is held in position in the condenser housing by a pair of diametrically opposite studs 38, one of which is shown in Fig. 4. These studs may take the form of a plunger 39 having at one end a reduced portion 40 for cooperation with the grooves 37, the stud being slidably mounted in a thimble 41 threaded into the condenser housing and biased towards the receiver 35 by a compression spring 42 as shown. By retracting the studs 38 and sliding the receiver axially until the studs enter a different groove, the position of the receiver 35 and negative holder 36 with relation to the condenser lens can be changed. On the other hand it will be evident that the receiver can be rotated around its axis freely. By means of this last adjustment the negative holder may be turned at an angle around a vertical axis, a pointer 43 carried by the receiver cooperating with indicia 44 on the condenser housing 11, see Fig. 1, to indicate the angle of rotation. As is explained in my pending application Serial No. 335,707, by providing for adjustment of the receiver around a vertical axis by rotating the receiver, and by providing for rotation around a horizontal axis by screw 12, correction can be made for distortion in the negative.

In actual practice I have found that it is usually preferable to form one of the studs 38 spring pressed as shown while the other one is in the form of a simple stud having a reduced end to fit the grooves 37 and with its shank threaded directly to the condenser housing. With this structure the receiver may be firmly locked in its angular position of adjustment by turning the stud until its reduced portion sets firmly into the bottom of the groove.

Figure 3:
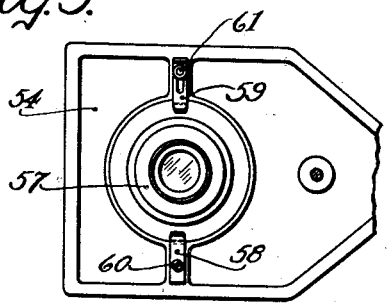
Fig. 3 is a view of the lens carriage taken on line 3—3 of Fig. 1.

At its lower end, see Figs. 4 and 5, receiver 35 is formed with an inturned flange 45 to which is attached as by screws 46 a bracket 47. At its inner end this bracket 47 in turn carries a flat plate-like member 48 provided with a central hole 49 and forming one member of the negative holder receiving structure. At its outer end the bracket is formed with a rod 51, see Fig. 1. A lens carriage 54 is mounted as at 55 for sliding motion along the rod 51 and is provided at the opposite end with an opening into which fits a lens housing 57. This last is held in position by clips 58 and 59 attached to the carriage 54 by screws 60 and 61, see Fig. 3. Clip 58 is preferably fixed in place while clip 59 is provided with a slot to permit it to be slipped outwardly to permit replacement of the lens barrel. By this construction the lens barrel may be rotated so as to bring the diaphhragm markings to the front no matter what the angular position of the receiver 35.

Figure 2:
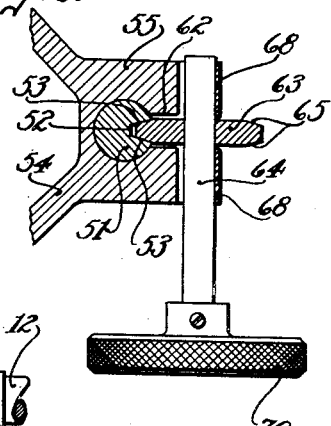
Fig. 2 is an enlarged sectional view on line 2—2 of Fig. 1.

As appears in Figs. 1 and 2, the journal 55 of the lens carriage 54 is formed with a slot 62 in alignment with a radial groove 52 formed in the rod 51. A driving wheel 63, fixed to a short shaft 64 and having friction surfaces 65 arranged to cooperate with complementary slanting walls 53 of the slot 51, is fitted into the slot 62. The shaft 64 is journaled to the carriage 54 by a pair of spring clips 68 attached as by screws 69 to the flat outer surface of the journal 55, and is provided at one end with a knurled knob 70 for turning the driving wheel 63 to adjust the lens carriage along the rod.

As is plain from Fig. 1, the frictional engagement between the driving wheel 63 and the slot 52 can be varied by adjusting the upper pair of the screws 69. By providing the rod 51 with the slot 52 having slanting side walls 53 which are engaged by the friction surfaces 65 of the wheel in combination with the aforementioned adjustment, the sliding action of the lens carriage 54 is always very smooth and allows a fine adjustment of the lens relative to the negative holder during focusing.

Referring now to Figs. 1, 4 and 5, the usual bellows 75 is provided to permit focusing of the lens. At its lower end the bellows may be secured in any suitable manner to the carriage 54, while at its upper end it is received between plate 48 and a ring 76, which is attached to the plate 48 as by screws 77. Fitted for sliding motion within the upper end of the bellows and the hole 49 in plate 48, is a sleeve 80 having an outturned flange 81 extending between the flange 45 on the receiver 35 and the upper surface of the plate 48. A leaf spring 82 is positioned on each side between flange 81 and the plate 48 and constantly urges the former towards the flange 45 on the receiver. When the enlarger is in use the negative holder 36 is inserted between flanges 81 and 45, being held in position by the action of the springs 82. Pieces of felt or other suitable material 84 and 85 may be suitably attached to the faces of flanges 45 and 81 to prevent the entrance of light. For the same purpose a ring of felt 85' may be attached to the upper surface of plate 46 in rubbing contact with the sleeve 80.

At opposite sides flange 81 has attached thereto a pair of studs 86 depending downwardly through holes 88 in plate 48. At the lower end these studs are connected by a bail member 89 pivoted thereto as by screws 90, see Figs. 5 and 6. The ends of this bail 89 extend beyond screws 90 to form cam members 91 for cooperation with plate 48. Comparing Figs. 1 and 5, when the bail is swung from the former to the latter position, the studs 86 and consequently flange 81 are drawn downwardly against the action of the leaf spring 82 to permit the withdrawal of the negative holder 36.

It will be recalled that the relative position of the receiver 35 and the condenser lenses can be changed by changing the slot engaged by the studs 38. The reason for this is that when the projecting lens 57 is replaced by one having for instance a shorter focal length, the carriage 54 must be adjusted nearer to the negative holder 36. As a result the lens will be shifted out of proper relation with the condenser. To compensate for this the receiver in this instance may be adjusted so that the studs 38 engage the upper groove 37, thereby moving the lens 57 further away from the condenser, see Fig. 1. If a longer focus lens 57 is used, the receiver can be adjusted so that the studs enter the bottom groove.

A further feature of the structure will be plain from Fig. 6, where the enlarger is shown being used as a copying camera. In this case the receiver is slid axially out of the condenser housing and can be mounted for instance on a suitable tripod 95 by means of a small angular bracket 96 formed as part of the bracket 46 and threaded to fit on a stud 97 on the tripod. The film of course is held in the film holder 36 while the lens 57 can be focused by viewing through the open end 98 of the receiver.

What I claim is:

1. A photographic enlarger comprising a vertically adjustable supporting arm, a housing mounted on said arm, a light housing, a condensing lens unit and a negative holder receiver carried by and supported on said housing and on a common axis, a lens and lens carriage carried and supported by said receiver and mounted for adjustment along said common axis relative to said receiver, said housing having thereon means for mounting said negative holder receiver for adjustment along said common axis relative to said condenser lens unit.

2. A photographic enlarger comprising a supporting arm, a housing mounted on said arm, a light housing, a condensing lens unit, and a negative holder receiver carried by said housing and on a common axis, said receiver having a cylindrical surface slidably reecived within said housing, a series of circumferential grooves formed in said cylindrical surface, means carried on said first mentioned housing and extending inwardly into releasable engagement with said grooves and a lens and lens carriage supported by said receiver and mounted for adjustment along said common axis relative to said receiver.

3. A photographic enlarger comprising a supporting arm, a housing mounted on said arm for rotation about a horizontal axis, a light housing, a condensing lens unit and a negative holder receiver carried by said housing and on a common vertical axis, said receiver being mounted in and supported by said housing for angular adjustment around or axial adjustment along said common axis, and a lens and lens carriage supported by said receiver and mounted for adjustment along said common axis relative to said receiver.

4. A photographic enlarger comprising a vertically adjustable supporting arm, a housing mounted on said arm, a light housing mounted on one end of said housing and extending above said first-named housing, a condenser lens unit supported by and within said first-named housing at said end of the housing, a negative holder receiver slidably received within said housing from the end of said housing opposite said first-mentioned end, said housing having thereon means to mount said receiver for adjustment relative to said condenser lens unit, and a lens and lens carriage adjustably supported on said receiver for adjustment relative to said receiver.

5. A photographic enlarger comprising a housing, a light housing and a condenser lens unit mounted on a common axis and in fixed relation to said first-named housing, a negative holder receiver supported by said housing, a lens and lens carriage carried by the receiver and mounted for adjustment relative to said receiver, and cooperating means on said receiver and first-named housing having adjustments for releasably holding said receiver in various positions along said axis relative to said condenser lens unit and for permitting said receiver and lens carriage to be removed as a unit.

6. A photographic enlarger comprising a supporting arm, a housing mounted on said arm, a light housing, a condensing lens unit, and a cylindrical negative holder receiver carried by said housing on a common axis, said negative holder receiver having at one end an inwardly directed annular flange forming an opening with its center on said axis, a bracket member carried by said receiver, a lens and lens carriage supported by said bracket for longitudinal adjustment along said axis, a plate having a circular opening therein carried by said bracket in spaced relation to the flange on said receiver with the center of the opening lying on said axis, a bellows attached at one end to said lens carriage and at the other end to the bottom of said plate and around the periphery of the opening in said plate, a sleeve slidably received within said opening and bellows and formed with an outwardly directed flange overlying said plate and underlying the flange on said receiver to thereby form a slot for reception of a negative holder, and means to resiliently urge said sleeve and the flange on the receiver relatively towards one another.

7. A photographic enlarger comprising a supporting arm, a housing mounted on said arm, a light housing, a condensing lens unit, and a cylindrical negative holder receiver carried by said housing on a common axis, said negative holder receiver having at one end an inwardly directed annular flange forming an opening with its center on said axis, a bracket member carried by said receiver, a lens and lens carriage supported by said bracket for longitudinal adjustment along said axis, a plate having a circular opening therein and carried by said bracket in spaced relation to the flange on said receiver with the center of of the opening lying on said axis, a bellows attached at one end to said lens carriage and at the other end around the periphery of the opening in said plate, a sleeve slidably received within said opening and bellows and formed with an outwardly directed flange overlying said plate and underlying the flange on the receiver, a pair of holes in said plate located at opposite sides of said opening, a pair of studs fastened to said outwardly directed flange and depending through said holes, a bail pivotally attached to the ends of said studs and provided with a cam portion positioned to bear against the bottom of the plate and pull the studs and outwardly directed flange away from the inwardly directed flange on the receiver when the bail is turned on its pivots, and spring means positioned between said plate and outwardly directed flange urging said outwardly and inwardly directed flanges into engagement.

8. A photographic enlarger comprising a supporting arm, a cylindrical housing mounted on said arm, a light housing supported in fixed relation on one end of said housing, a condensing lens unit and a cylindrical negative holder receiver supported in nested relation within said housing and all on a common axis and with the receiver protruding beyond the other end of the housing, a lens and lens carriage supported by said receiver for longitudinal adjustment along said axis, means in the protruding portion of the receiver for holding a negative holder at right angles to said axis between said lens and condenser unit and comprising an upper plate and a lower plate mounted for relative sliding motion along said axis, additional means to resiliently force said plates toward each other and a lever for relatively moving said plates against the action of said last-named means to permit the insertion of a negative holder between said plates.

GEORGE G. MORIN.